US006292564B1

United States Patent
Cowan et al.

(10) Patent No.: US 6,292,564 B1
(45) Date of Patent: Sep. 18, 2001

(54) MODULAR JACK PROTECTIVE COVER FOR HARSH ENVIRONMENTAL CONDITIONS

(75) Inventors: Douglas L. Cowan, Snellville, GA (US); Jason A. Kay, Morristown; David S. Kerr, Morris Plains, both of NJ (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/246,933

(22) Filed: Feb. 9, 1999

(51) Int. Cl.[7] .................................................. H04M 1/00
(52) U.S. Cl. .............................................................. 379/438
(58) Field of Search ........................... 174/53, 56, 50.51, 174/54.55; 379/419, 428, 437, 440; 439/676, 535, 135, 136, 138, 140; D13/147; 339/42, 40

(56) References Cited

U.S. PATENT DOCUMENTS

| D. 400,859 | * | 11/1998 | Tulley et al. | D13/147 |
| 4,188,082 | | 2/1980 | Dickey | 339/36 |
| 4,538,874 | | 9/1985 | Dambach et al. | 339/99 |
| 4,624,516 | * | 11/1986 | White | 339/40 |
| 4,666,225 | * | 5/1987 | Hampton et al. | 339/42 |
| 4,723,919 | | 2/1988 | Crane | 439/521 |
| 5,487,675 | | 1/1996 | Daoud | 439/95 |
| 5,888,079 | | 3/1999 | Norden | 439/142 |
| 5,964,600 | * | 10/1999 | Miles et al. | 439/140 |

* cited by examiner

*Primary Examiner*—Fan Tsang
*Assistant Examiner*—Nora J Putt

(57) ABSTRACT

A modular jack for telephone and data equipment test access ports including a cover having substantially the same thermal coefficient of expansion as its housing, and which is integral with the housing to prevent its being lost during usage or testing. The cover extends inwardly of the housing, to rotate further inwardly, automatically, upon the insertion of the plug into the housing to complete the electrical circuit.

4 Claims, 2 Drawing Sheets

MODULAR JACK PROTECTIVE COVER FOR HARSH ENVIRONMENTAL CONDITIONS

BACKGROUND OF THE INVENTION

1. Field of the Invention

This invention relates to the testing of telephone lines, in general, and to the testing of such lines as used in voice and data transmission for both personal and business users, in particular.

2. Description of the Related Art

With the advent of deregulation in the telephone industry has come the need to determine whether a problem on a line is external to a structure (and, therefore, the obligation of the telephone company to correct) or internal to the structure (and, thusly, the responsibility of the end-user to deal with). Network interface devices developed to address this concern commonly employ anywhere from 1 to 200 modular jacks as test access ports, depending upon whether the monitoring is of a line that may be present in a residence, or at a business location. Whether or not the modular jack is of an RJ 11 type carrying 2 conductors, or whether it is of an RJ 45 type carrying 8 or 9 conductors, and whether or not the network interface devices additionally incorporate such other features as surge suppression or lightning, over-current or over-voltage suppression controls, the ever increasing competition in the telephone industry requires that the costs associated with these devices be kept as low as possible. These costs include, not only the manufacturing costs of the units, but the installation costs, as well, in addition to the costs connected with their actual use in testing the problem on the line.

SUMMARY OF THE INVENTION

One area of investigation—leading to the present invention—for keeping these various costs low deals with the modular jacks employed, themselves. More specifically, at present, these modular jacks are provided as two separate pieces, the jack and its cover, which then must be fitted together. Besides the labor cost associated with joining the pieces, this type of manufacture militates against the savings inherent if the manufacture and fitting were automated. Secondly, testing has shown that during thermal cycling—even over as little a temperature change as 30° occurring during a typical day—the coupling between the installed cover and its underlying jack can range between a snug fit and a very loose one, impairing the degree of securement desired. Analysis has indicated that this results from the different temperature coefficients of expansion between the hard plastic jack and the rubberized polymer material employed for the cover. As a result, frequently, a service technician accidently drops the cover when accessing the jack, and has to search for it in the grass and/or leaves present at an outdoor location for the network interface device—thereby, unnecessarily adding to the labor costs of testing a line. Moreover, even in those circumstances where the cover does not separate from the jack, the typical operation is for the technician to hold the cover open with one hand, accessing the test port with his electrical plugs and tools with the other hand, all the while balancing the test equipment against his, or her, body; this, too, ultimately adds to the time spent in testing the cause of the on-line problem, adding to the costs of responding to, and servicing the customer's complaints. Were all this not enough, another oftentimes overlooked expense for the telephone company is present and to be factored in—namely, the inventory control and re-ordering requirements needed for the two separate items of the jack and its cover.

While an obvious answer might be the simple "doing away with" of the cover, field use has shown the need for the cover when the network interface device is used outdoors, or in other harsh environments, where otherwise exposing the modular jack to dust, rain, and the other elements causes problems up to, and including the short-circuiting of the telephone line, and the loss of all connections. To prevent this from happening—and even though all these other costs incidental to the modular jack are present—the continuing use of a cover to protect and seal the modular jack is necessary.

As will become clear from the following description, these problems of the prior art are addressed by the modular jack of the present invention for use with telephone and data equipment testing. As will be seen, the jack of the invention includes a housing incorporating a plurality of contact wires for completing an electrical circuit when receiving a plug inserted through an opening in the housing, along with a cover sealing the opening when the plug is not inserted, as in the prior art. However, in accordance with the invention, the cover is fabricated as an integral part of the housing—and not separate from it—, and further is of the same substantial composition as the housing to exhibit substantially the same thermal coefficient of expansion. In making the cover an integral part of the housing (so as to capture it, and so that the cover is not lost during testing), a hinge is provided to join the cover and housing together and, preferably, a spring type hinge.

In one embodiment of the invention to be described, the integral cover will be seen to extend outwardly of the housing in sealing its opening when the technician's plug is not inserted, to be rotated further outwardly and away from the opening when the cover is first manually lifted, for the insertion of the electrical plug. In a second embodiment, the cover will be seen to extend inwardly of the opening, sealing it when the plug is not inserted, and to be rotated further inwardly of the opening as the cover is automatically lifted through the insertion of the plug into the housing. With both the housing and the cover in these two embodiments formed of a hard plastic material, the same thermal coefficients of expansion are present, so that the cover does not loosen with temperature cycling during environmental use. By having the cover integral with the housing, the covers cannot get lost in the field—which saves the replacement cost of the cover and the time to obtain replacements for it, and extends the overall life of the modular jack itself. By further fabricating the housing and cover of a hard plastic material, and as an integral part, further savings inherent in an automation manufacture and assembly follows, in further keeping costs low. Thus, obviously, with only one part to deal with, inventory control is simplified, and the cost of ordering eased.

BRIEF DESCRIPTION OF THE DRAWINGS

These and other features of the present invention will be more clearly understood from a consideration of the following description, taken in connection with the accompanying drawings in which.

DETAILED DESCRIPTION OF THE INVENTION

Figure 1:
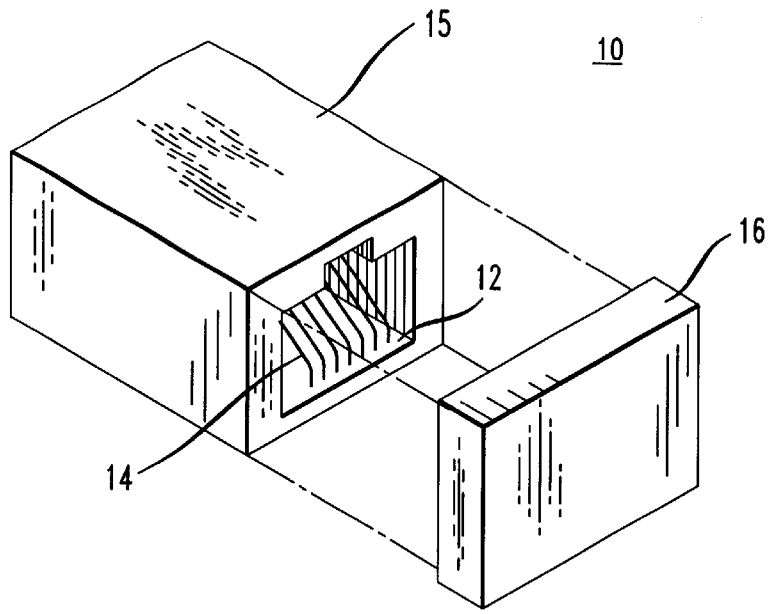
FIG. 1 is a perspective view of a modular jack for a telephone and data equipment test access port constructed in accordance with the prior art.

The modular jack of the prior art is shown in FIG. 1 with its opening 12 exposing the contact wires 14 included within its housing 15, to be connected with an inserted electrical plug (not shown), as a test access port. Typically fabricated of a hard plastic material, the jack is sealed by a separate cover 16 fitted over the housing 15 at the opening 12, and usually of a rubberized polymer material. When the electrical plug is to be inserted, the cover 16 is removed from the opening 12. After the testing has completed and the plug removed, the cover 16 is replaced.

Figure 2A:
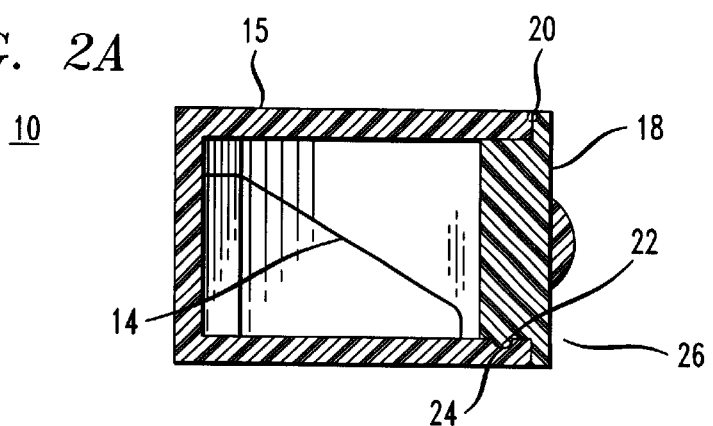
FIGS. 2a and 2b are sectional views helpful in an understanding of a first embodiment of the invention in which an integral cover extends outwardly of the jack in sealing the housing when the test plug is not inserted, and rotates further, outwardly and away from the opening when the cover is manually lifted to insert the plug, respectively.

In the cross-section view of FIG. 2a, a cover 18 is hinged at 20 integral with the housing 15, when fabricated together as a single, hard plastic molded part—and, preferably, through an automated process. In the "closed" position of FIG. 2a, a dimple 22 on the cover 20 fits within an aperture 24 on the housing 15 so as to lock the cover 18 in place in sealing the jack when no electrical plug is to be inserted. With a handle 26 extending upwardly from the cover 18, the cover 18 is rotatable outwardly away from the opening 12 when the cover 18 is first manually lifted away by the servicing technician to facilitate insertion of the electrical test plug into the opening 12. By having the hinge 20 in the nature of a spring hinge, the cover 18 remains substantially in the position shown in FIG. 2b, as the electrical plug is being inserted. This frees one hand of the technician, allowing the other hand to hold the test equipment without any need for balancing it against the body. Simple to manufacture, the spring hinge 20 is biased for closing the opening 12 by pushing the handle 26 in the direction shown by the arrow "A", the arrow "B" showing the rotation to open the cover 18.

Figure 2B:
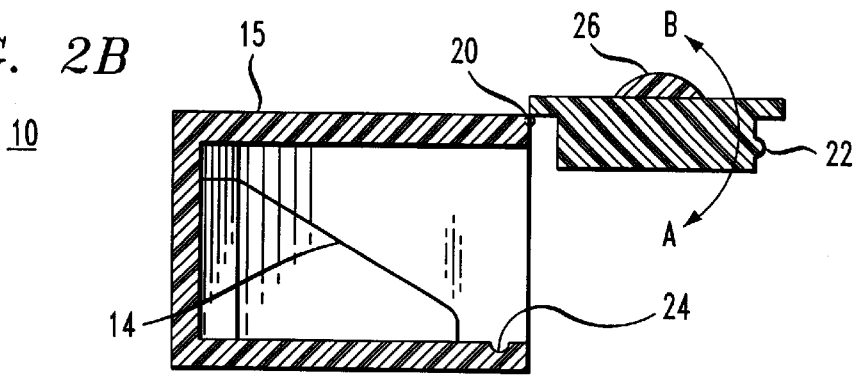
Figure 3A:
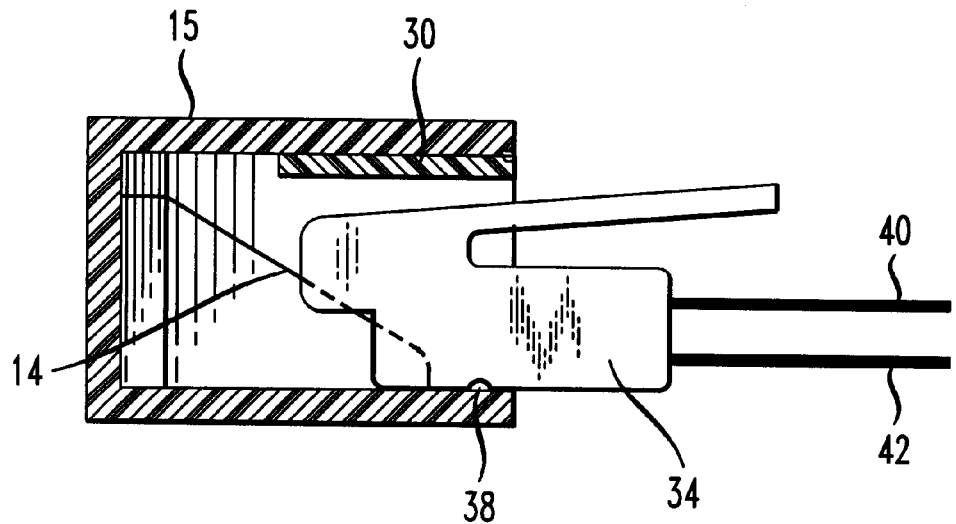
FIGS. 3a and 3b are sectional views helpful in an understanding of a second embodiment of the invention in which the integral cover extends inwardly of the modular jack in sealing the housing when the test plug is not inserted, and which is rotated further inwardly, and automatically lifted, by the insertion of the plug into the jack, respectively.
Figure 3B:
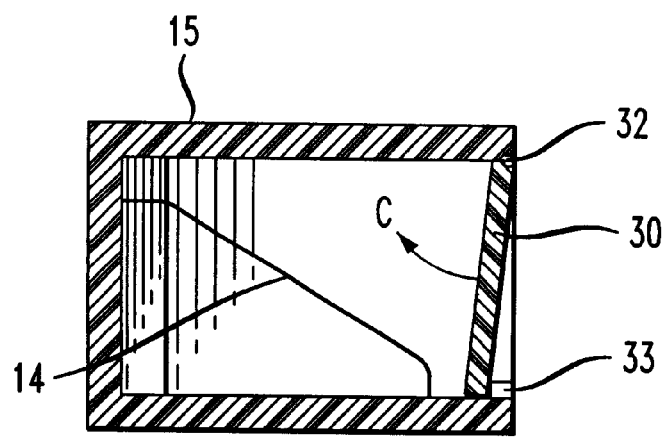

Whereas the embodiment of the invention illustrated by FIGS. 2a and 2b is particularly attractive for a network interface device connected externally of a personal residence—as where only one or at most a few modular jacks for test access are provided—, the embodiment illustrated by the sectional views of FIGS. 3a and 3b prove quite attractive for use in high density business areas, where upwards of 50, 100, and even up to 200 telephone lines are incorporated, as in business entrance terminal and/or business entrance protector network interface devices (where the tightness of space makes it awkward for the technician to lift the cover of the jack through finger manipulation). In the arrangement of FIGS. 3a and 3b, the integral cover 30 extends inwardly of the opening 12 in sealing the opening when the plug is not inserted (FIG. 3b). The hinge coupling with the housing 15 is shown at 32, again preferably of a "spring" construction. A rib 33 molded on the inside of the housing 15 serves as a "stop" in setting the quiescent position for the cover 30 when the electrical plug is not present. Inserting the plug 34 automatically lifts the cover 30 in the direction shown by the arrow "C", rotating the cover 30 further inwardly to the position shown in FIG. 3a when the plug 34 is fully inserted. A slot 38 in the plug 34 may be provided to overlay the rib 33 in defining the fully inserted position for the plug 34, at which point the electrical connection with the contact wire 14 is completed. Reference numerals 40, 42 in FIG. 3a identify the leads back to the technician's test equipment (not shown).

As with the embodiment of FIGS. 2a and 2b, the cover 30 and the housing 15 of FIGS. 3a and 3b are fabricated of a hard plastic material, exhibiting a common temperature coefficient of expansion to continue unchanged their initial fit during temperature cycling, while continuing to seal the jack against dust, rain, snow, etc. in protecting against such environmental conditions as might deleteriously affect the user's telephone line coupled to the jack. Although the configuration of FIGS. 3a and 3b might cost slightly more to manufacture than the configuration of FIGS. 2a and 2b due to its more complex design, the configuration offers the advantage of increased ergonomics, simplification of use, and a high density of activity with reduced operator impact time—thereby making it especially attractive for high density, high use network interface devices.

While there have been described what are considered to be preferred embodiments of the present invention, it will be readily appreciated by those skilled in the art that modifications can be made without departing from the scope of the teachings herein which analysis has shown can easily lead to upwards of a 50 percent reduction in the manufacturing cost of the modular jack, and can result in up to a 75% reduction in time spent in testing—both of which lead to significant cost savings in installation and use. For at least such reason, therefore, resort should be had to the claims appended hereto for a true understanding of the scope of the invention, in its use of a cover integral with the housing for capturing the cover so that it cannot be lost during testing by the field technician, and of fabricating both the cover and the housing of the same thermal coefficient of expansion so as to prevent any loosening with temperature cycling.

We claim:

1. A modular jack for telephone and data equipment test access ports sited in an outdoors environment comprising:

a housing exposed to dust, humidity, precipitation and temperature variations in said outdoors environment;

a plurality of contact wires within said housing at said outdoors site for completing an electrical circuit at an equipment test access port when receiving a test plug inserted through an opening therein; and a cover for scaling said test access port against the entry of dust, humidity and precipitation when said plug is not inserted;

with said cover being fabricated as an integral part of said housing and of a material having substantially the same thermal coefficient of expansion as said housing so as to continue to seal said test access port against dust, humidity and precipitation in the presence of temperature variation at said site;

a hinge joining said cover and said housing together;

wherein said cover extends inwardly of said opening about said hinge in sealing said opening when said plug is not inserted;

wherein said hinge is coupled to said housing at a point to rotate said cover further inwardly of said opening when said cover is automatically lifted by the insertion of said plug into said opening; and including a rib on an inside of said housing to serve as a "stop" in setting a quiescent position for said cover when said plug is not inserted.

2. The modular jack of claim 1 wherein said rib is positioned in said housing for defining a fully inserted position for said plug when inserted into said opening.

3. A modular jack test access port for telephone and data equipment sited in an outdoors environment, and of a type incorporating a plurality of contact wires for completing an electrical circuit when receiving a test plug inserted into said jack, said jack comprising:

a housing exposed to dust, humidity, precipitation and temperature variations in said outdoors environment;

a plurality of contact wires within said housing at said outdoors site for completing an electrical circuit when receiving a test plug inserted through an opening in said housing to access said equipment;

a cover for sealing said opening and said test access port against the entry of dust, humidity and precipitation when said plug is not inserted; and a hinge joining said cover and said housing together as a one-piece construction of said modular jack; and with said cover being of a material having substantially the same thermal coefficient of expansion as said housing, so as to continue to seal said modular jack test access port against dust, humidity and precipitation in the presence of temperature variation at said site in the absence of said test plug;

wherein said cover extends inwardly of said opening about said hinge in sealing said opening when said plug is not inserted;

wherein said hinge is coupled to said housing at a point to rotate said cover further inwardly of said opening when said cover is automatically lifted by the insertion of said plug into said housing; and including a rib on an inside of said housing to serve as a "stop" in setting a quiescent position for said cover when said plug is not inserted.

4. The modular jack of claim 3 wherein said rib is positioned in said housing for defining a fully inserted position for said plug when inserted into said opening.

* * * * *